Figure 1:
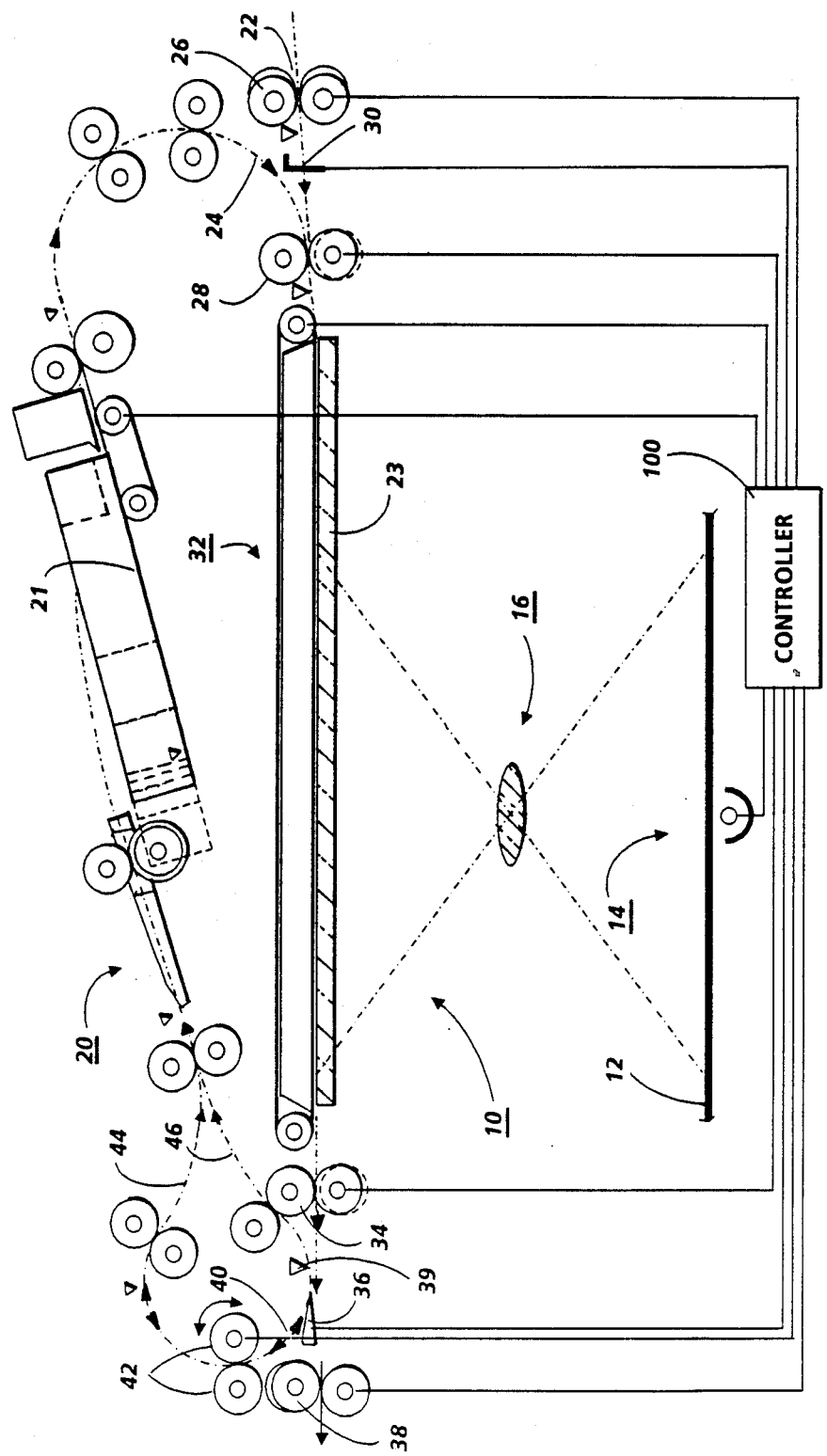

United States Patent [19]

Acquaviva et al.

[11] Patent Number: 4,844,434
[45] Date of Patent: Jul. 4, 1989

[54] MID FORM START CF DOCUMENT FEEDER

[75] Inventors: Thomas Acquaviva, Penfield; Ronald R. Wierszewski, Henrietta; Stephen A. Demchock, Rochester, all of N.Y.

[73] Assignee: Xerox Corporation, Stamford, Conn.

[21] Appl. No.: 94,210

[22] Filed: Sep. 8, 1987

[51] Int. Cl.⁴ .............................................. B65H 5/22
[52] U.S. Cl. ...................................... 271/3; 271/273; 355/308
[58] Field of Search ............................ 271/3.1, 3, 273

[56] References Cited

U.S. PATENT DOCUMENTS

| | | | |
|---|---|---|---|
| Re. 31,891 | 5/1985 | Tickner et al. | 355/75 |
| 3,446,554 | 5/1969 | Hitchcock et al. | 355/75 |
| 4,291,974 | 9/1981 | Silverberg | 355/76 |
| 4,295,737 | 10/1981 | Silverberg | 355/76 |
| 4,421,306 | 12/1983 | Muka | 271/5 |
| 4,440,492 | 4/1984 | Howard | 355/76 |
| 4,462,527 | 7/1984 | Taylor et al. | 226/15 |
| 4,470,591 | 9/1984 | Acquaviva | 271/245 |
| 4,526,309 | 7/1985 | Taylor et al. | 226/33 |
| 4,579,325 | 4/1986 | Pinckney et al. | 271/3.1 |
| 4,579,326 | 4/1986 | Pinckney et al. | 271/3.1 |
| 4,589,652 | 5/1986 | Silverberg | 271/245 |
| 4,620,782 | 11/1986 | Kurando et al. | 271/3 X |
| 4,621,801 | 11/1986 | Sanchez | 271/251 |
| 4,664,509 | 5/1987 | Christy et al. | 271/3 X |

OTHER PUBLICATIONS

SIR, [H17]–published 2/4/86, "Computer Forms Web Copying Apparatus", by Stephen J. Wenthe, filed Aug. 26, 1983.

*Primary Examiner*—Joseph J. Rolla
*Assistant Examiner*—David H. Bollinger

[57] ABSTRACT

A plural mode automatic document handling system for a copier adapted to feed either conventional document sheets or continuous computer form web documents over the imaging station platen of the copier without using sprocket feeding, which includes a platen cover unit pivotably openable relative to said platen, with frictional drive roller sets upstream and downstream of the platen for feeding continuous computer form web over the platen having a first set of feed wheels mounted to the platen cover unit and pivotable therewith and a mating, opposing, second set of feed wheels stationarily mounted to the copier, which opposing sets of feed wheels form non-slip nips when the platen cover unit is closed over the platen, but which nips are opened when the platen cover unit is opened to allow intermediate web position loading of a computer form web. A system is also provided for doing so without interference by the platen transport. A CF mid-form start registration system is provided for automatically advancing a selected intermediate web position into a desired registration position for automatic feeding and copying after the intermediate web position loading and after the platen cover unit has been pivotably closed. There is a common input for inputting either conventional document sheet documents or one end of continuous computer form web documents to the automatic document handling system, and a common document path for feeding eiher document from the common input over the platen of the copier through the same platen transport. Additional roller drives are provided in the common document path adjacent the platen for conventional document sheets, which are automatically disengaged in response to sensing of the acquisition of web documents.

1 Claim, 2 Drawing Sheets

MID FORM START CF DOCUMENT FEEDER

Hereby cross-referenced, and incorporated by reference, is the copending application of the same assignee, U.S. Ser. No. 029,027, now U.S. Pat. No. 4,794,429, entitled "Automatic Dual Mode Sheet and Web Document Transport For Copiers" Filed Mar. 23, 1987 by the same Thomas Acquaviva (sole) (Attorney Docket No. D/86036). A request is made for any priority benefit which may be available.

The present invention relates to copier document handling, and, more particularly, to automatic dual mode document feeding for presentation to the imaging station of a copier of individual documents to be copied, or computer form web documents to be copied, in which copying of the web can be more easily started intermediately of the web, rather than only from one end of the web.

There is disclosed here a system enabling intermediate web starting positions for a computer form web document in a plural mode document feeder. With this system, a fan-fold stacking web document does not need to be started at one end thereof in the document handler, and then slewed for a long distance up to the web segment desired to be copied. Nor does the web have to be burst at the desired region, which is undesirable in many cases. In fact, certain CF web users are not even allowed to burst or otherwise separate computer form web. For example, for copying bank audit computer printouts. Also, a reregistration feature is provided for the intermediate web starting position here. These intermediate start of copying features are also valuable for copier job recovery and restart where a copier or DH jam occurs during a CF web copying run.

Intermediate web starting positions for a single purpose computer form web document feeder may be possible for certain sprocket drive type single purpose computer form feeders (separate CFF's) which are mechanically capable of this, such as the "1075" CFF kit introduced in the latter part of 1983. The latter apparatus (but not this function) is the subject of U.S. Statutory Invention Registration (SIR) Number H17, published Feb. 4, 1986, by Stephen J. Wenthe, Jr. (D/83159). It is not known if other prior CFF such as "Inchworm" (not U.S. Pat. No. 3,446,554 issued May 26, 1969 to A. M. Hitchcock et al) were even capable of this. Clearly, the Xerox Corporation "7000" Copier CFF was not, because there the CF web had to be threaded under a platen registration gate only liftable by a small distance. In the Xerox Corporation "1075" Copier CFF/SADH, partially shown for example in U.S. Pat. No. 4,526,309 issued July 2, 1985 by T. N. Taylor et al (supra), and other references cited herein, there is dual mode document handling and frictional feeding, but the roller nips upstream and downstream of the platen, and the CF input guide, all are in the platen cover unit, so that the CF path does not open when the platen cover unit is lifted. The logic did not allow CF mid form start either. Likewise, the Xerox Corporation "1090" Copier dual mode RDH/CFF has closed feed roller nips through which the web must be fed.

The providing here of the rollers forming one half of the fed nips for the CF document in the copier body itself rather than in the platen cover unit with their mating rollers is unconventional. Heretofore it would have normally considered undesirable or impractical to consider providing such rollers on the upper surface of the copier adjacent the platen.

The present concept is believed to be novel for a non-sprocket and dual mode (combined DH/CFF) unit. Such a dual mode unit does not require physical substitution of a whole different feeder just for CFF, as does said U.S. SIR H17 and the like). Known prior such combined or plural mode document handlers could not open along all the CF feed nips and reprogram a new registration or starting position to provide this feature of CF copying starting from a mid form position of the web. This should not be confused with copiers which open internally or "clamshell" along the copy paper feed roller path nips, for jam clearance removal of copy sheets internally therefrom, which is well know.

With the present system a single integral unit document handler can provide all document handling modes: RDH, ADF, SADH and CFF, with either single burst sheet CF copying, or automatic CF registration and copying by feeding in one end of the unburst web, or do so starting with any desired intermediate panel or segment of the web. This provides a significant simplification of document handling systems and operator usage.

Referring to art of interest, one example of a tractor drive CFF for a copier with the prior art solution provision for high speed slewing to feed the web up to the desired portion to be copied is illustrated in Xerox Corporation Re. 31,891 reissued May 21, 1985 to D. R. Tickner et al. An exemplary low friction belt and vacuum platen transport system, with means for vacuum reduction for document slippage (for a different function), is taught, for example, in Xerox Corporation U.S. Pat. No. 4,589,652 issued May 20, 1986 to M. Silverberg (D/85119). Other art is noted therein. DH cross-roller side registration and deskewing is taught, for example in Xerox Corporation U.S. Pat. No. 4,621,801 issued Nov. 11, 1986 to H. J. Sanchez, and other art noted therein. Other DH art noted by way of interest or background includes Xerox Corporation U.S. Pat. No. 4,440,492 issued Apr. 3, 1984 to A. Howard (D/82084) on selectively actuatable vacuum; and U.S. Pat. No. 4,470,591 issued Sept. 11, 1984 to T. Acquaviva (D/82083) on high/low friction belt materials (e.g., Col.7).

Particularly noted are any of the following patents with simular disclosures on the Xerox Corporation "1075" SADH/CFF. This is a dual document or dual mode semi automatic document handler for cut sheet or CFF input, with frictional roller CF feeding and side registration: U.S. Pat. No. 4,462,527 issued July 31, 1984 to T. N. Taylor and S. J. Wenthe, Jr. (D/82108), U.S. Pat. No. 4,526,309 issued July 2, 1985 to T. N. Taylor et al (noted infra), and U.S. Pat. No. 4,485,949 issued Dec. 4, 1984 to S. A. Gebhart and R. Parks (D/82091).

Other DH art as to reducing the vacuum transport vacuum level and other functions is noted for example in Xerox Corporation U.S. Pat. No. 4,295,737 issued Oct. 20, 1981 to M. Silverberg, especially Col. 6, lines 4–19 (D/78258); and Xerox Corporation U.S. Pat. No. 4,291,974 issued Sept. 29, 1981 to M. Silverberg, especially Col. 6, line 66 - Col. 7, line 13 (D/78258Q); and Eastman Kodak Company U.S. Pat. No. 4,421,306 issued Dec. 20, 1983 to R. S. Muka allowing the belt to continue moving while the document is stationary. U.S. Pat. No. 4,501,510 issued Feb. 26, 1985 to L. H. Andersson shows a printer or typewriter feeder with CF or sheet feeding with means to reduce frictional feed pressure.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semiautomatic document handling (SADH), allowing an operator to "stream feed" originals into an input of the copier document handler or feeder, or to provide an automatic document handler (ADH) for automatic feeding from a stack of documents, with the document feeder in either case doing the deskewing, feeding and final registration of the documents into the copying position, and then ejecting the documents from the platen automatically.

The art of original document sheet handling for copiers has been intensively pursued in recent years. Various systems have been provided for automatic or semiautomatic feeding of document sheets to and over the imaging station of the copier for copying. The documents are normally fed over the surface of an imaging station comprising a transparent platen, into a registered copying position on the platen, and then off the platen. Such automatic or semiautomatic document handlers eliminate the need for the operator to place and align each document on the platen by hand. This is a highly desirable feature for copiers. Document handlers can automatically feed documents as fast as they can be copied, which cannot be done manually with higher speed copiers, thus enabling the full utilization or productivity of higher speed copiers.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for the document handler.

Although faster, more accurate, and automatic feeding into and registration of each document at the correct position on the platen to be copied is highly desired, this is difficult to accomplish without skewing (rotating) the document and/or damaging the edge of the document, particularly as it is being stopped. One problem is that documents can vary widely in sheet size, weight, thickness, material, condition, humidity, age, etc., Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A4, B4, etc.). In contrast, documents even in the same set may have come from completely different paper batches or have variably changed size with different age or humidity conditions, etc.. Furthermore, the images on documents and their fusing can change the sheet feeding characteristics and these images may be subject to damage in feeding if not properly handled, e.g. smearing of fresh typewriting ink. Yet it is desirable to automatically or semiautomatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying as well as registering the document.

The cited art shows several approaches to registering a document for copying at an appropriate position relative to the transparent copying window. Typically the document is registered on one axis by driving it with a platen transport against a mechanical gate or stop positioned temporarily or permanently at or adjacent one edge of the platen. This is often at or closely adjacent the downstream edge of the platen. That allows unidirectional movement of the document across the platen, entering from the upstream side or edge closely following the proceeding document and ejecting after copying from the downstream side or edge of the platen. The registration gate or stop may comprise projecting aligned fingers, or roller nips, or a single vertical surface along one registration line, against which an edge of the sheet, preferably the leading edge, is driven into abutment to mechanically stop and thereby register the sheet on one axis, in its principal direction of movement. Another function of such mechanical registration is to also deskew the document, i.e., to properly rotate and align it with this registration line as well as to determine and control its registration position. However, such a mechanical gate cannot be interposed in the path of a continuous web document and thus cannot be used for intermediate registration thereof.

As disclosed, for example, in U.S. Pat. Nos. 4,043,665 issued Aug. 23, 1977 to J. R. Caldwell; 4,132,401 issued Jan. 2, 1979 to J. F. Gauranski, et al; or 4,295,737 or 4,391,505 issued Oct. 20, 1981 and July 5, 1983 to Morton Silverberg, document registration can desirably be done without mechanical document stops on the platen. This can be done by preregistering the document to a platen transport belt with upstream, off-platen, preregistration fingers or rollers, and then moving the document a known, preset, distance over the platen on the belt into registration, providing there is no slippage during this entire movement between the document and the belt.

Alternatively, this can be done by sensing, on the platen or upstream of the platen, with a document edge sensor, the edge of a document being transported onto the platen and then stopping the document platen transport then or after a preset time period or movement to stop the document on the platen. Off-platen document edge sensing (see below) is preferred, since reliable on-platen sensing is more difficult and generally requires special sensors and platen transport modifications or adaptations such as disclosed in said U.S. Pat. Nos. 4,391,505 and in 3,473,035 and 3,674,363. Thus, particularly noted in U.S. Pat. No. 3,674,363 to E. O. Baller et al, issued July 4, 1972, e.g. Cols. 8 and 9, second paragraph, and Col. 10, first paragraph, disclosing sensing the document trail edge upstream of the platen to initiate slowdown and stopping of the platen transport. Said U.S. Pat. No. 3,473,035, issued Oct. 14, 1969 to J. F. Gardner, is particularly noted as to SW1 in FIG. 7 and its description re operator selectable document stopping/shifted imaging positions. A recent measured-stop registration system is taught in U.S. Pat. No. 4,579,444 issued Apr. 1, 1986 to T. S. Pinckney and H. J. Sanchez (D/84074).

The following additional references also apparently sense a document sheet trailing edge as the reference time for initiating a control "count" or fixed distance drive for controlling the document sheet feeding drive on the copier platen: IBM Tech. Discl. Vol. 19, No. 5, Oct. 1976, pp. 1589-1591, and U.S. Pat. Nos. 3,829,083 and 3,936,041, to Shiina et al (Ricoh), and 4,066,255 issued Jan. 3, 1978 to W. F. Bradbury (Addressograph-Multigraph Corp.), and Xerox Disclosure Journal publications Vol. 2, No. 3, May/June 1977, p. 49, and Vol. 3, No. 2, March/April 1978, pp. 123-124.

Examples of U.S. Patents on servo-motor or stepper-motor driven original document feeders in general are Nos. 3,888,579; 4,000,943; 4,144,550; 4,283,773 and 4,455,018.

In some document handling systems a system for also side registering (laterally positioning) the document on the platen is used, i.e. aligning the original on both axes while on the platen, e.g. U.S. Pat. Nos. 4,411,418 or 4,335,954. However two axes on-platen registration is not required, and such lateral or second axis registration may be done upstream of the platen, as by confinement of the documents within the side guides in the document tray from which the documents are fed, or driving the sheet against a side guide, e.g. U.S. Pat. Nos. 4,257,587; 4,266,762 or 4,381,893.

In the description herein the term "document" or "sheet" refers to a usually flimsy sheet of paper, plastic, or other such conventional individual image substrate, and not to microfilm or electronic images which are generally much easier to manipulate. It is important to distinguish electronic copying systems, such as the Xerox "9700" printer, which read and store images of documents electronically and create copies by writing on a photoreceptor with a laser beam, or the like, since they do not have the problems dealt with here.

The "document" here is the sheet (original or previous copy) being copied in the copier onto the outputted "copy sheet", or "copy". Related plural sheets of documents or copies are referred to as a "set". A "simplex" document or copy sheet is one having an image and page on only one side or face of the sheet, whereas a "duplex" document or copy sheet has a "page", and normally an image, on both sides.

The present invention is suitable for either precollation copying, i.e. automatically plurally recirculated document set copying provided by a recirculating document handling system or "RDH"; or nonprecollation, or postcollation, copying, such as semiautomatic document handling (SADH) as discussed above, or almost any automatic document feeder (ADF).

Some examples of Xerox Corporation U.S. RDH Patents are U.S. Pat. No. 4,459,013 issued July 10, 1984 to T. J. Hamlin et al, U.S. Pat. No. 4,278,344 issued July 14, 1981 to R. B. Sahay, and U.S. Pat. Nos. 4,579,444,325 or 4,579,326. Some other examples of recirculating document handlers are disclosed in U.S. Pat. Nos. 4,076,408; 4,176,945; 4,428,667; 4,330,197; 4,466,733 and 4,544,148. A preferred vacuum corrugating feeder air knife, and a tray, for an RDH are disclosed in U.S. Pat. Nos. 4,418,905 and 4,462,586. An integral semi-automatic and computer form feeder (SADH/CFF), which may be an integral part of an RDH, as noted in Col. 2, paragraph 2, therein, is disclosed in U.S. Pat. No. 4,462,527. Various others of these patents, such as U.S. Pat. No. 4,176,945 above, issued Dec. 4, 1979 to R. Holzhauser (Kodak) teach plural mode, e.g. RDH/SADH, document handlers.

However, postcollation copying, or even manual document placement, is desirable in certain copying situations to minimize document handling, particularly for delicate, valuable, thick or irregular documents, or for a very large number of copy sets. Thus, it is desirable that a document handler for a precollation copying system be compatible with, and alternatively usable for, postcollation and manual copying as well.

The present invention overcomes various of the above-discussed problems, and provides various of the above features and advantages.

A feature of the specific embodiment disclosed herein is to provide, in a plural mode automatic document handling system for a copier adapted to feed either conventional document sheets or continuous computer form web documents over the imaging station platen of the copier and without using sprocket feeding, which automatic document handling system includes a platen cover unit pivotably openable relative to said platen, said platen cover unit containing platen transport means for feeding conventional document sheets over said imaging station platen and providing an imaging background surface, the improvement characterized by frictional drive roller means upstream from said platen and frictional drive roller means downstream from said platen for feeding said continuous computer form web documents over said platen, wherein both said frictional drive roller means comprise a first set of feed wheels mounted to said platen cover unit and pivotable therewith and a mating, opposing, second set of feed wheels stationarily mounted to said copier, which opposing sets of feed wheels form non-slip nips when said platen cover unit is closed over said platen, but which nips are opened when said platen cover unit is pivotably opened relative to said platen to allow intermediate web position loading of continuous computer form web documents into said opened nips and over said imaging station platen of the copier, and means for allowing the intermediate web position loading and feeding of continuous computer form web documents over said platen by said frictional drive roller means without interference by said platen transport means.

Further features provided by the system disclosed herein, individually or in combination, include those wherein: the automatic document handling system further includes means for automatically advancing a selected intermediate web position of a continuous computer form web document into a desired registration position for automatic feeding and copying after said intermediate web position loading and after said platen cover unit has been pivotably closed relative to said platen over said web; wherein the automatic document handling system comprises common input means for inputting either conventional sheet documents or one end of continuous computer form web documents to said automatic document handling system, and common document path means for feeding either conventional documents sheets or continuous computer form web documents from said input means over said imaging station platen of the copier through said platen transport means; or wherein said document handling system includes additional roller drive means in said common document path means for engaging said conventional document sheets adjacent said platen transport means, which additional roller drive means are automatically disengaged in response to said sensing of the acquisition of continuous computer form web documents by said document handling system.

Some examples of various other prior art copiers with document handlers, and especially with control systems therefor, including document sheet detecting switches, etc., are disclosed in U.S. Pats. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Figure 2:
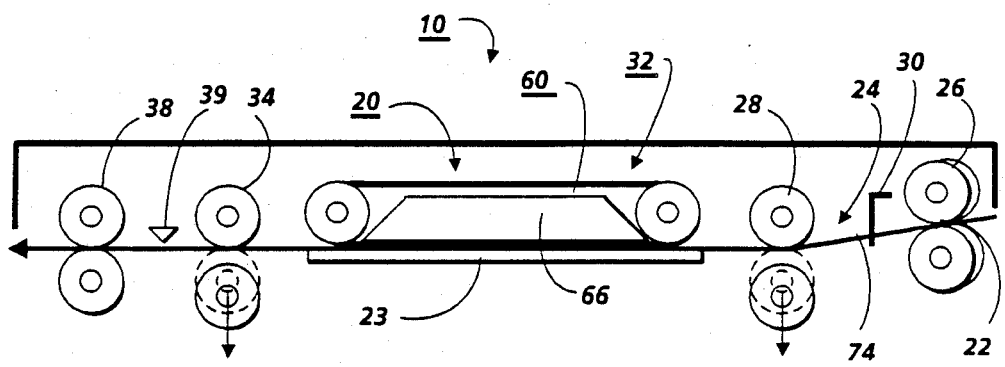
Figure 3:
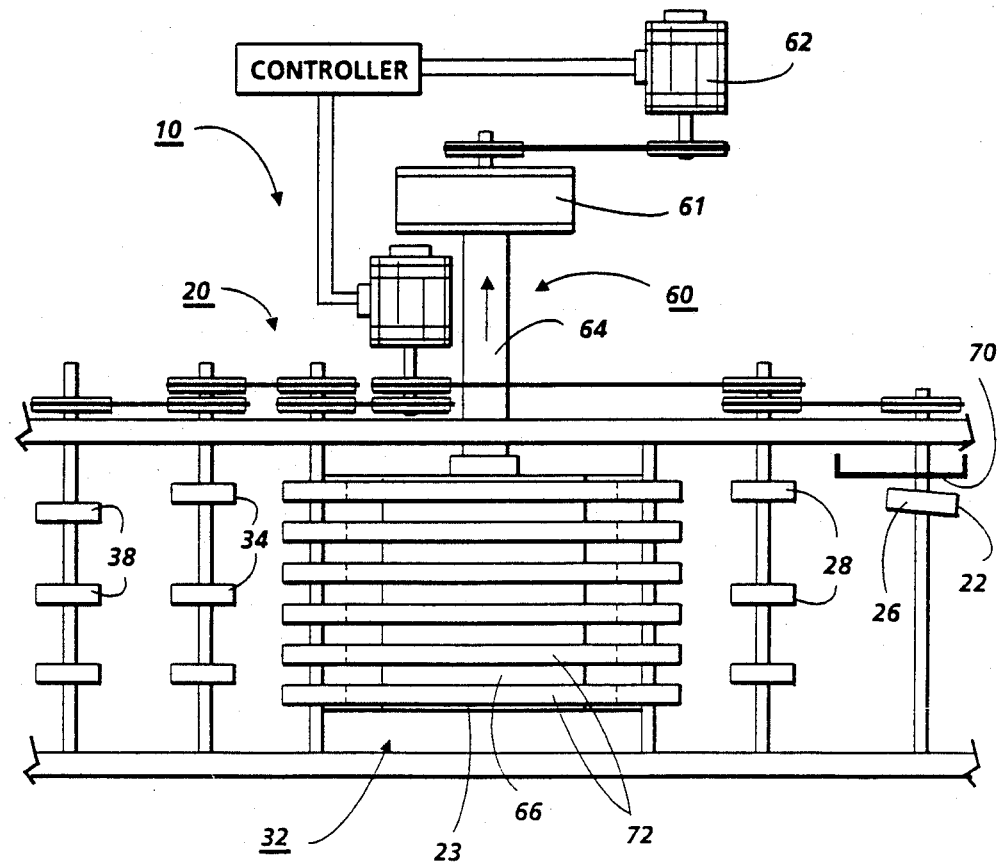

Various of the above-mentioned and further features and advantages will be apparent from the specific apparatus and its operation described in the example below. The present invention will be better understood by reference to this description of this embodiment thereof, including the drawing figures (approximately to scale), wherein:

FIG. 1 is a side view of an exemplary document handler for a copier, incorporating the system of the invention (in this example, a single integral plural mode RDH(simplex & duplex)/SADH/CFF, also providing mid form CF starting);

FIG. 2 is a schematic side illustration of the platen transport of the document handler of FIG. 1, operating to feed and present a computer form web document to the platen, showing the pivotal platen cover unit consisting of elements within the illustrated cover, which are above the illustrated CF path, and the copier mounted elements of the DH below the illustrated CF path; and FIG. 3 is a top view of the apparatus of FIG. 2.

Describing now in further detail the specific example illustrated in the Figures, there is shown a copier 10 with a document handling system 20, (preferably an RDH, to be described herein) both somewhat similar in part to that disclosed in the above-cited U.S. Pat. No. 4,469,319 and other patents referenced, but specifically modified and adapted for plural mode document feeding as described herein. It provides for automatically transporting either individual registered and spaced document sheets onto and over the conventional platen imaging station 23 of the copier 10; or for feeding and sequential copying of segments of a continuous web document.

The document handling (DH) system 20 is exemplary, and may be readily modified for different copiers. It has two separate document inputs, a recirculating or RDH input stacking tray 21 on top, and an SADH side entrance 22 for semiautomatic document handling, especially for larger documents, which may be optionally inserted short edge first there, or undersize documents, or CF web.

The DH system 20 here has the ability to do mid form CF starts at any desired panel of the CF web. It can do this because when the DH unit is opened the feed roll nips fully open, with the drivers lifting up with the platen cover unit and the idlers unconventionally remaining on or below the copier 10 surface, and the operator has full access to the platen 23.

In many copier/duplicator applications customers using large (lengthy) computer forms would like to start the copying process at somewhere other than the first panel. Usually the only way to start in the middle of a fan fold stack is to load the lead edge of the CF into the document handler, slew the web through the DH at high speed without copying up to the proper panel, and then finally start copying from there. However, for long forms, e.g., several hundred panels, that takes too much time, and can even introduce feeding errors or jams.

Here CF is normally fed from one end thereof into the SADH slot 22 on the right of the DH, deskewed against a gate or edge 30, driven to the platen with an on feed roll nip, driven across the platen with a vacuum transport, driven off the platen with the Off feed roll nip, and finally driven out of the DH with the exit roll nip.

However, when this DH 20 is opened, all nips are separated along the CF document path shown in FIG. 2, and free access is provided to the platen and the entire CF feed path. All components above the path lift up with the platen cover unit. This allows the operator to place any selected intermediate portion of the CF web on the platen, with the web panels to be skipped placed in the output stacking tray, and the panels to be copied placed in the input tray.

Although not required, an additional on-platen automatic registration step is provided here for such a mid web start. The web panel immediately ahead of the first panel to be copied may be placed at a manual registration edge position on the platen. When the DH is closed and START is pressed, the software automatically advances the web one panel, such that the trailing perforation of the first required panel is registered on the glass at a desired registration position, which may differ from the manual copying position. This allows the panels to be automatically registered at any desired copying position. i.e., at the appropriate command, the software automatically advances the web form one panel to get the correct trail edge panel perforation registered, and begin copying from there. In other words, one edge of the selected mid web position may be initially manually registered to the conventional manual registration edge at one end of the platen, but then when the platen cover is closed the CF feed rollers will automatically advance the web into a different, desired, registration position for copying the first intermediate web panel to be copied, then continue to incrementally advance and copy web segments at that desired, registration position. For example, such a desired registration position for automatic feeding and copying may be with one edge of each panel positioned several millimeters out onto the platen glass from one platen edge, which cannot be done accurately by the operator.

Furthermore, this may be done automaticaly, so that the operator does not have to indicate that a mid-form start is about to occur. Instead, one of the jam/timing sensors may be interrogated, e.g., output sensor 39. If the sensor is covered by the CF form, while CFF mode is selected, the controller 100 software assumes that it is a mid form start from this sensor input and the CFF mode selection. (During mid-form start the initial jam checks of the first panel entering the SADH/CFF slot 22 are ignored.) If this sensor is not covered, as in normal CFF feeding from one end of the web into SADH slot 22, then the first panel of the web is advanced onto the platen to registration, rather than providing the above mid form registration movement.

Other than the DH 20 document system modifications and controls and other features to be described herein, the exemplary copier 10 may be, e.g., the well known "Xerox" "1075" or "1090" or any other xerographic copier, as illustrated and described in patents cited above, including U.S Pat. No. 4,278,344 and others. The exemplary copier 10 may conventionally include a xerographic photoreceptor belt 12 and the conventional xerographic stations acting thereon for respectively charging, image exposing at 14, image developing, etc.. Documents on the platen 23 are imaged onto the photoreceptor 12 at 14 through a variable reduction ratio optical imaging system 16 to fit the document images to the selected size of copy sheets. The copier 10 is adapted to provide duplex or simplex precollated or postcollated copy sets from either duplex or simplex original documents copied from the same RDH 20.

The control of all sheet feeding is, conventionally, by the machine controller 100. The controller 100 is preferably a known programmable microprocessor, exemplified by the previously cited art. The controller 100 conventionally controls all fo the machine steps and functions described herein including the operation of the document feeder 20, the document and copy sheet gates, the feeder drives, etc.. As further taught in those references, the controller 100 also conventionally provides for storage and comparison of the counts of the copy sheets, the number of documents recirculated in a document set, the desired number of copy sets and other selections by the operator through the panel of switches thereon, time delays, jam correction control, etc..

Referring further to the exemplary plural mode document handling system 20 illustrated in FIG. 1, it may be seen that input documents, including CF web, may be fed to a preregistration gate 30 from the SADH input 22. The gate 30 may have any of the various specific configurations and operating mechanisms illustrated in various of the above-noted prior art references on registration gate systems. It is retractable in and out of the document path preferably by solenoid actuation controlled by the controller 100. It is positioned ahead of the common or intersecting point of input of the RDH input 24 and the SADH input 22, as illustrated in FIG. 1.

The SADH input 22 also includes slightly skewed cross-rollers 26. As taught in the above-cited U.S. Pat. No. 4,579,444, these provide side edge registration (at edge guide 70 - see FIG. 3) as well as feeding of the document forward for registration and deskewing against the gate 30. Such cross-rollers may also be provided in the RDH input path 24. Just downstream of the gate 30 are take-away or on-platen rollers 28 providing a document sheet feeding nip for engaging and transporting any portion of the document which is past the gate 30. They feed the documents directly into the platen transport system 32, which comprises plural vacuum belts for engaging and transporting the documents without slippage over the platen 23 into the desired registration position. The platen transport system 32 and the rollers 28 may be incrementally servo motor driven by the controller 100 in a manner taught by various of the above-cited references.

After the documents are copied on the platen 23, they are, in this system, ejected into downstream or off-platen rollers 34 and onto a decision gate 36. If the gate 36 is up (it always is for CF) it deflects the documents to a document output or ejector including output rollers 38. If the decision gate 36 is down, sheet documents are deflected into an RDH return path 40. However, this RDH return path 40 includes reversible rollers 42 to provide a choice of two return paths to the RDH tray 21; a simplex return path 44 with an inversion in the path, or a duplex return path 46 without inversion in that path. The duplex return path 46 provides a desired inversion of duplex documents as returned to the tray 21 for a subsequent circulation or circulations, described in the above-cited art. This is because the duplex document has had only one inverison per circulation, only in the RDH input path 24. In contrast, in the total simplex circulation path there are two inversions per circulation, which equals no inversion, because the total simplex recirculation path includes one inversion in each of the paths 24 and 44.

It will be noted that the respective document paths include various sensors for sensing the lead and/or trail edge of the document sheets, schematically illustrated in FIG. 1 by the conventional representation of an arrowhead or triangle. All of these sensors are, of course, conventionally connected to the controller 100 to be utilized in the operation of the DH system 20.

As illustrated, the RDH tray 21 includes a variable position rear registration edge or backstop, illustrated here with several dashed lines, for initially accommodating and restacking various sizes of documents. The illustrated DH system 20 utilizes for its RDH feeding a known combined corrugated vacuum feeding and air knife separator system for feeding out sequentially the bottom-most sheet of the stack in the tray 21, as described in various of the above-cited references.

As shown in the Figures, for normal or cut sheet document feeding in the DH system 20 the sheets are inputted at the SADH tray or guide input 22, or from the RDH input path 24 from RDH tray 21, which has its own cross-roller. The SADH input 22 path includes the side (rear edge) registering cross-rollers 26. This same SADH input 22 is normally desirably commonly used here for CF web input also, since it provides for basically planar or straight through web feeding of the CF web 74, as shown in FIG. 2.

For cut sheet SADH input 22 document feeding in the DH system 20, the documents are fed and controlled by, in order, the cross-rollers 26, the nips of the on-roll rollers 28, the platen vacuum belt transport 32, the nips of the downstream or off-roll rollers 34, and then the nips of the output or exit roll rollers 38.

It is important to note that in the system here, the portions of all of these roller pairs 26,28,34 and 38 below the document path are idler rollers mounted to the body of the copier. All the above-path rollers in each of these nip pairs are the driven rollers, and all of those are mounted to the pivotal platen cover unit of the DH system 20. Thus, these above-path rollers may all be lifted up, away from the platen 23, to expose it and to open all these roller nips along with the opening of the platen transport.

Furthermore, the below-path idlers of the rollers 28 and 34 are desirebly movable by motor/cam or solenoid retractors to the dashed-line positions shown in FIG. 2, or FIG. 1, so as to open those nips for CFF even when the DH system 20 is pivoted down into its closed, operating, position. The idler shaft repositioning system mechanism may be conventional. This opening of the on-roll 28 and off-roll 34 nips is done automatically as part of the CFF mode of operation. This may be done by the controller 100 automatically applying or removing electrical power to the idler rolls repositioning system when CFF feeding is selected and a document sensor 39 adjacent the nip of the downstream exit rollers 38 senses that the CF has been acquired by that nip. By opening those nips for CF web feeding, only the exit roll 38 nips are hard-engaged on the CF web 74, desirably pulling the web 74 through the DH system under only the feeding control of that nip 38. The input skewed cross-rolls 26 also remain engaged on the CF web 74, but that nip is designed to slip and to not overfeed or buckle the web 74. However, the input skewed rolls 26 continue to urge the web 74 laterally back against the input edge guide 70 to maintain rear edge registration of the wed during its feeding.

As an additional, optional, feature, for assistance in urging and maintaining said CF web rear edge registration for very long webs, the shaft of the exit rolls 38 may be very slightly angled to the document path. Or, the driving roll diameters may be made slightly larger at the front than the rear. Either can induce a slight rearward skewing movement force on the web 74, as described in the above-cited U.S. Pat. No. 4,462,527 issued July 31, 1984 to T. N. Taylor and S. J. Wenthe, Jr., The vacuum for the exemplary platen transport system 32 here may be provided by a conventional vacuum system 60 including a conventional DH vacuum blower 61 driven by a motor 62 when the blower motor 62 is turned on by the controller 100. A vacuum duct 64 pneumatically connects the blower 61 to the manifold or plenum 66 overlying the platen 23. As shown, for example, in the above-cited U.S. Pat. No. 4,589,652 issued May 20, 1986 to M. Silverberg, the vacuum may be applied to the documents via apertures in the lower surface of the plenum 66 through the spaces between the plural platen transport belts 72 to hold the document against these low-friction platen transport belts 72 with a normal force sufficient to prevent relative slippage therebetween as long as this high vacuum level is applied by the vacuum system 60. The vacuum level appropriate for this will depend on the particular belt material, spacing, etc.. The level indicated in the above-cited patents is in the order of 8 mm of water for belts with a coefficient of friction of approximately 0.3–0.35.

However, in the system here, when CFF feeding is selected, and a document sensor 39 adjacent the nip of the downstream exit rollers 38 senses that the CF has been acquired by that nip, the controller 100 automatically removes electrical power from the blower motor 62 to remove the applied vacuum, and thereby greatly reduce the normal force between the platen transport belts 72 and the CF document.

Thus, in the conventional or cut sheet document mode, documents are deskewed at the platen transport entrance, transported, controlled-stop registered, and removed from the platen, all by relatively high vacuum level application to the document sheet through relatively low friction materials belts. The high vacuum level holds the document with a high normal force against the belts, sufficient to prevent relative slippage. In contrast, in the CFF mode the belts 72 are free to slip and normally only somewhat assist in transporting the continuous web panels. [However, if desired, the high vacuum may be left on for just the initial feed-in of the initial CF web segment or panel, as described.]

To summarize, in the CFF mode operation, the first web panel is preferably manually inserted into the known rear edge registration and deskewing system 26 and 70 at the auxiliary SADH input 22 of the RDH, which deskews it. The side registration guide 70 is only in the document input area. Then, when the initial web panel has passed over the platen, the vacuum may be removed, so that another set of non-slip feed rolls 38 adjacent the platen exit, along with said skewed feed rolls 26 adjacent the platen entry, can maintain alignment of the rear side of the web panel to the rear registration position. Note that, desirably, there is no registration edge on or over or against the edge of the platen 23, and thus no source of edge drag skewing forces there. Since the web is being driven by only one set of drive rolls 38, and not by the platen transport belts 72 (since the vacuum normal force is greatly reduced), nor the other (now opened) roller nips, what would otherwise be inherent cumulative web-damaging problems with even small speed differentials therebetween are eliminated with this system. Yet the document feeding path, hardware, and operations for CFF are largely common and fully compatible with the very different feeding requirements for much shorter conventional individuals sheets which must be "handed off" from one feeding nip to another along the document path with very restricted slippage to ensure positive and registered feeding.

In order for both these pre platen 26 and post platen 38 rollers to function properly and to prevent excessive frictional drag of the CF web against the rear edge platen registration guide 70, and other drag forces, the web must be free to slip laterally relative to the platen transport belt system. This is provided both by using a greatly reduced or eliminated vacuum force on the document, so that it is only loosely engaged with the transport belt or belts, and also because these belts 72 are of relatively low surface friction material such as Mylar ® or other relatively low friction materials. A suitable exemplary low friction belt system and vacuum system (and alternative means for vacuum reduction) is taught, for example, in the above-cited U.S. Pat. No. 4,589,672 issued May 20, 1986 to M. Silverberg.

Once the CF web is under the control of (nipped by) both sets of rollers 26 and 38, at the platen input and output sides, the belts 72 still continue to move at substantially the same speed as these nips, incrementally cycling at the proper acceleration, speed and deceleration for each web segment or panel advance. But the web advance is actually under the primary control of the output roll 38 nips, not the belts 72. The downstream roll 38 nips are hard nips pullings the web without slippage, whereas the upstream roll 26 nip is providing deskewing and provides slippage, so that only one roller speed is controlling and no buckling or tearing forces can be exerted on the web. Thus, in the CFF mode, the belt system serves as a low friction secondary or assist drive, and as a white backup or image background surface to reduce show-around or show-through copy defects, but not as a high driving force device as it does for cut sheet documents.

The incremental CFF advance and forward or web segment registration driving of the downstream rollers 38 is preferably controlled by the controller 100 by CF sprocket hole counting and registration, as described for example in the above-cited U.S. Pat. No. 4,485,949 issued Dec. 4, 1984 to S. A. Gebhart and R. Parks.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a plural mode automatic document handling system for a copier with a platen imaging station for frictionally feeding conventional document sheets or continuous computer form web documents over said platen without using sprocket feeding, said automatic document handling system comprising a platen cover unit pivotably openable and closable relative to said platen and said copier, said platen cover unit containing platen transport means for feeding conventional documents sheets over said platen, the improvement comprising;

first frictional computer form web document drive means mounted upstream from said platen, and second frictional computer form web drive means mounted downstream from said platen, for feeding continuous computer form web documents over said platen;

wherein both said first and second frictional computer form web document drive means comprise a first set of drive rollers mounted to said platen cover until and pivotable away from said platen and said copier therewith, and a mating, opposing, second set of idler rollers mounted to said copier, which opposing sets of drive rollers and idler rollers form closed nips for said frictional computer form web document feeding when said platen cover unit is closed over said platen, but which nips are automatically opened when said platen cover unit is pivotably opened relative to said platen, to provide for intermediate web position loading of continuous computer form web documents into said opened nips and over said platen of said copier, without interference by said platen transport means;

wherein said plural mode automatic document handling system additionally comprises common input means for inputting either conventional document sheet documents or one end of a continuous computer form web document, and common document path means for feeding either a conventional document sheet or a continuous computer form web document from said input means over said platen through said platen transport means;

and means for sensing the acquisition of a continuous computer form web document by said document handling system whether inputed from said common input means or by said intermediate web position loading, further including additional retractable roller drive means in said common document path means for engaging conventional document sheets adjacent said platen transport means, which additional retractable roller drive means are automatically retractably disengaged in response to said means for sensing the acquisition of a continuous computer form web documented by said document handling system.

* * * * *